US012717534B2

(12) United States Patent
Jeong et al.

(10) Patent No.: US 12,717,534 B2
(45) Date of Patent: Aug. 25, 2026

(54) DISPLAY DEVICE FOR TRANSMITTING A UIBC TRIGGER AND OPERATION METHOD THEREOF

(71) Applicant: LG ELECTRONICS INC., Seoul (KR)

(72) Inventors: Hyojeong Jeong, Seoul (KR); Taejin Park, Seoul (KR); Eunjung Lee, Seoul (KR); Kyungnam Bae, Seoul (KR); Byungil Mun, Seoul (KR); Byounghyun Shin, Seoul (KR); Jeonghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/711,474

(22) PCT Filed: Nov. 19, 2021

(86) PCT No.: PCT/KR2021/017114

§ 371 (c)(1),
(2) Date: May 17, 2024

(87) PCT Pub. No.: WO2023/090493

PCT Pub. Date: May 25, 2023

(65) Prior Publication Data

US 2025/0021290 A1 Jan. 16, 2025

(51) Int. Cl.

| | |
|---|---|
| ***G06F 3/14*** | (2006.01) |
| ***G06F 3/0484*** | (2022.01) |
| ***G06F 3/16*** | (2006.01) |

(52) U.S. Cl.

CPC .......... *G06F 3/1423* (2013.01); *G06F 3/0484* (2013.01); *G06F 3/167* (2013.01)

(58) Field of Classification Search

CPC ....... G06F 3/1423; G06F 3/0484; G06F 3/167

See application file for complete search history.

(56) References Cited

U.S. PATENT DOCUMENTS

| | | | |
|---|---|---|---|
| 11,068,148 | B2 | 7/2021 | Iwami et al. |
| 2013/0089006 | A1 | 4/2013 | Huang et al. |

(Continued)

FOREIGN PATENT DOCUMENTS

| | | |
|---|---|---|
| KR | 10-1604296 | 3/2016 |
| KR | 10-2018-0080980 | 7/2018 |
| KR | 10-2281341 | 7/2021 |

OTHER PUBLICATIONS

European Patent Office Application Serial No. 21964879.7 Search Report dated Sep. 11, 2024, 8 pages.

(Continued)

*Primary Examiner* — Kwang-Su Yang

(74) *Attorney, Agent, or Firm* — LEE, HONG, DEGERMAN, KANG & WAIMEY

(57) ABSTRACT

A display device according to an embodiment of the present invention may comprise: a wireless communication unit for performing wireless communication with a mobile terminal; a display unit for displaying a mirroring image based on an image displayed by the mobile terminal; and a control unit for receiving a user input signal while displaying the mirroring image, and transmitting a user input back channel (UIBC) trigger to the mobile terminal through the wireless communication unit when the received user input signal is determined as the UIBC trigger for execution of a UIBC function.

13 Claims, 15 Drawing Sheets

(56) References Cited

U.S. PATENT DOCUMENTS

| | | | | |
|---|---|---|---|---|
| 2016/0337457 | A1* | 11/2016 | Kim | H04L 67/51 |
| 2017/0255304 | A1 | 9/2017 | Lee et al. | |
| 2017/0324794 | A1* | 11/2017 | Jeong | H04L 67/025 |
| 2018/0004383 | A1* | 1/2018 | Iwami | G06F 3/0487 |
| 2018/0070122 | A1 | 3/2018 | Baek et al. | |
| 2018/0341453 | A1* | 11/2018 | Nakagawa | G06F 3/0484 |
| 2020/0042281 | A1* | 2/2020 | Nakagawa | H04L 65/612 |
| 2021/0303252 | A1* | 9/2021 | Bae | H04N 21/43637 |

OTHER PUBLICATIONS

PCT International Application No. PCT/KR2021/017114, International Search Report dated Aug. 5, 2022, 4 pages.

* cited by examiner

```
    sendUIBCEvent
{
    "uibcId":3,
    "uibcInfo":{
      "type":"   mousedown",
      "button":0,
        "screenX":1158,
        "screenY":452
    }
}
```

DISPLAY DEVICE FOR TRANSMITTING A UIBC TRIGGER AND OPERATION METHOD THEREOF

CROSS-REFERENCE TO RELATED APPLICATION(S)

This application is the National Stage filing under 35 U.S.C. 371 of International Application No. PCT/KR2021/017114, filed on Nov. 19, 2021, the contents of which is hereby incorporated by reference herein in its entirety.

TECHNICAL FIELD

The present disclosure relates to a display device.

BACKGROUND ART

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

Also, recent TVs provide a screen mirroring function such as screen sharing with mobile terminals.

DISCLOSURE OF INVENTION

Technical Problem

The present disclosure aims to automatically determine a user's intention to control a mobile terminal and to easily set a UIBC function during mirroring.

Technical Solution

According to an embodiment of the present disclosure, a display device includes a wireless communication interface that performs wireless communication with a mobile terminal, a display that displays a mirroring image based on an image being displayed by the mobile terminal, and a controller that receives a user input signal while displaying the mirroring image, and transmits a user input back channel (UIBC) trigger to the mobile terminal through the wireless communication interface when the received user input signal is determined as the UIBC trigger for execution of a UIBC function.

Advantageous Effects

According to an embodiment of the present disclosure, it is possible to automatically determine a user's intention to control a mobile terminal during mirroring and set the execution of a UIBC function without a complicated process.

Accordingly, the convenience of control of the UIBC function may be greatly improved.

BRIEF DESCRIPTION OF DRAWINGS

FIG. 3 shows an example of an actual configuration of a remote control device according to an embodiment of the present disclosure.

BEST MODE FOR CARRYING OUT THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
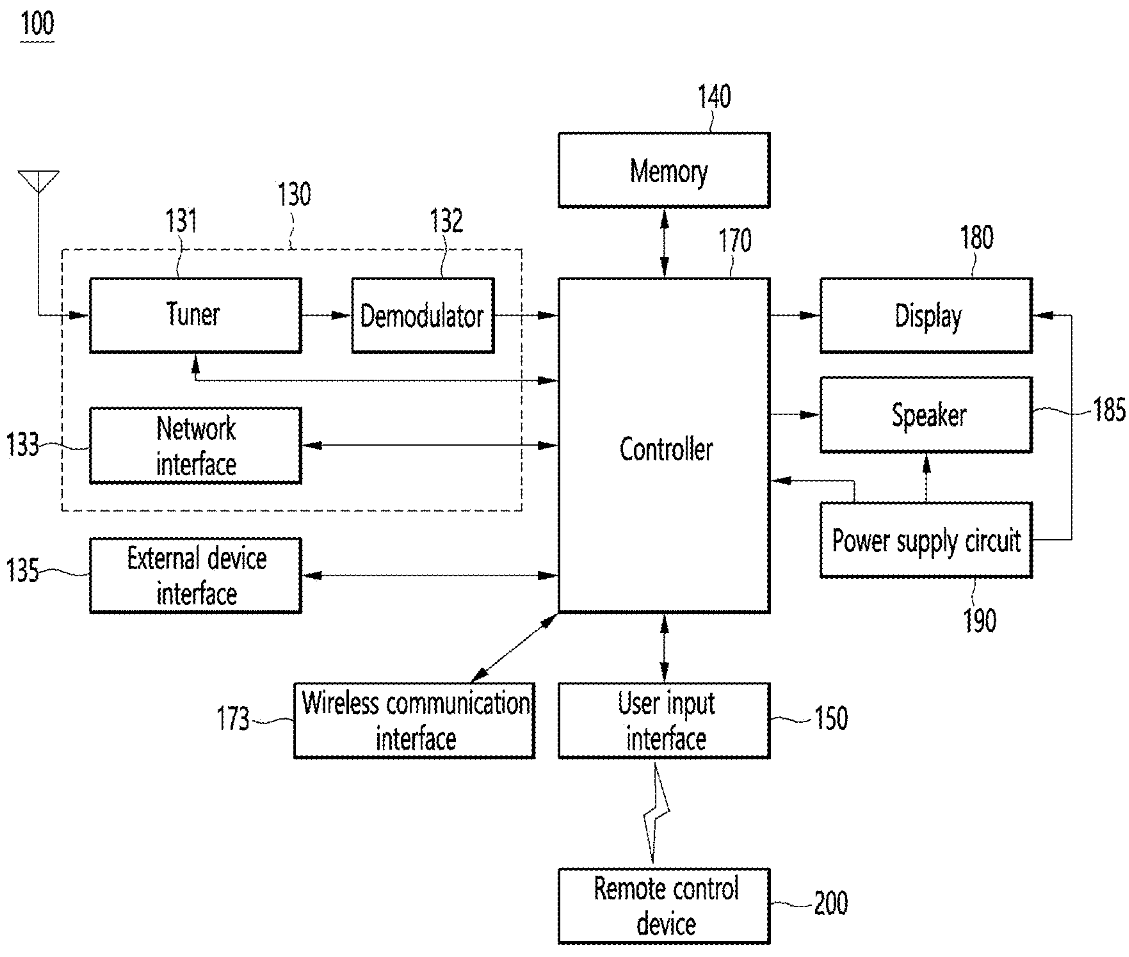
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100. Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
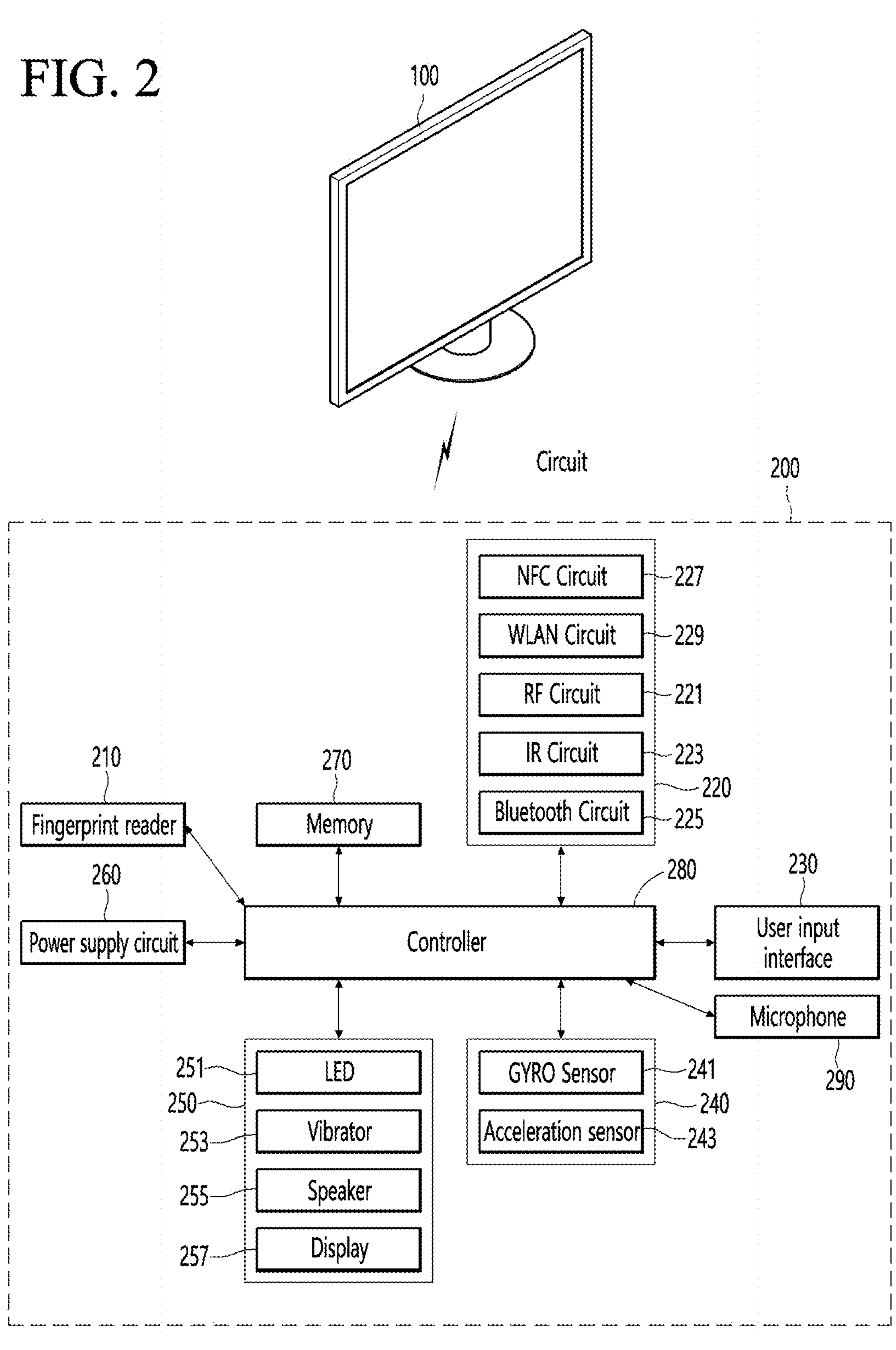
FIG. 2 is a block diagram of a remote control device according to an embodiment of the present disclosure.
Figure 3:
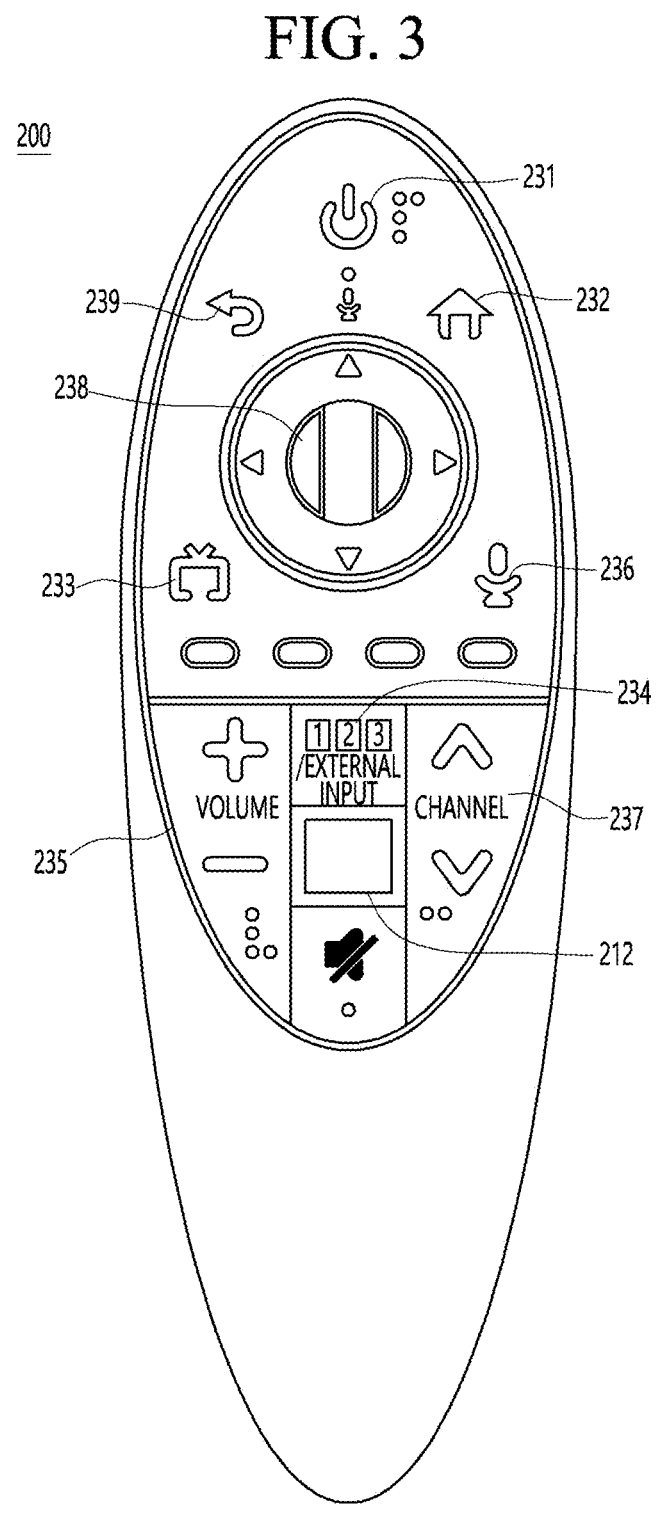

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100. The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200. When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

The microphone 290 may include at least one microphone 291 and obtain speech through the microphone 291.

Next, a description will be given referring to FIG. 4.

Figure 4:
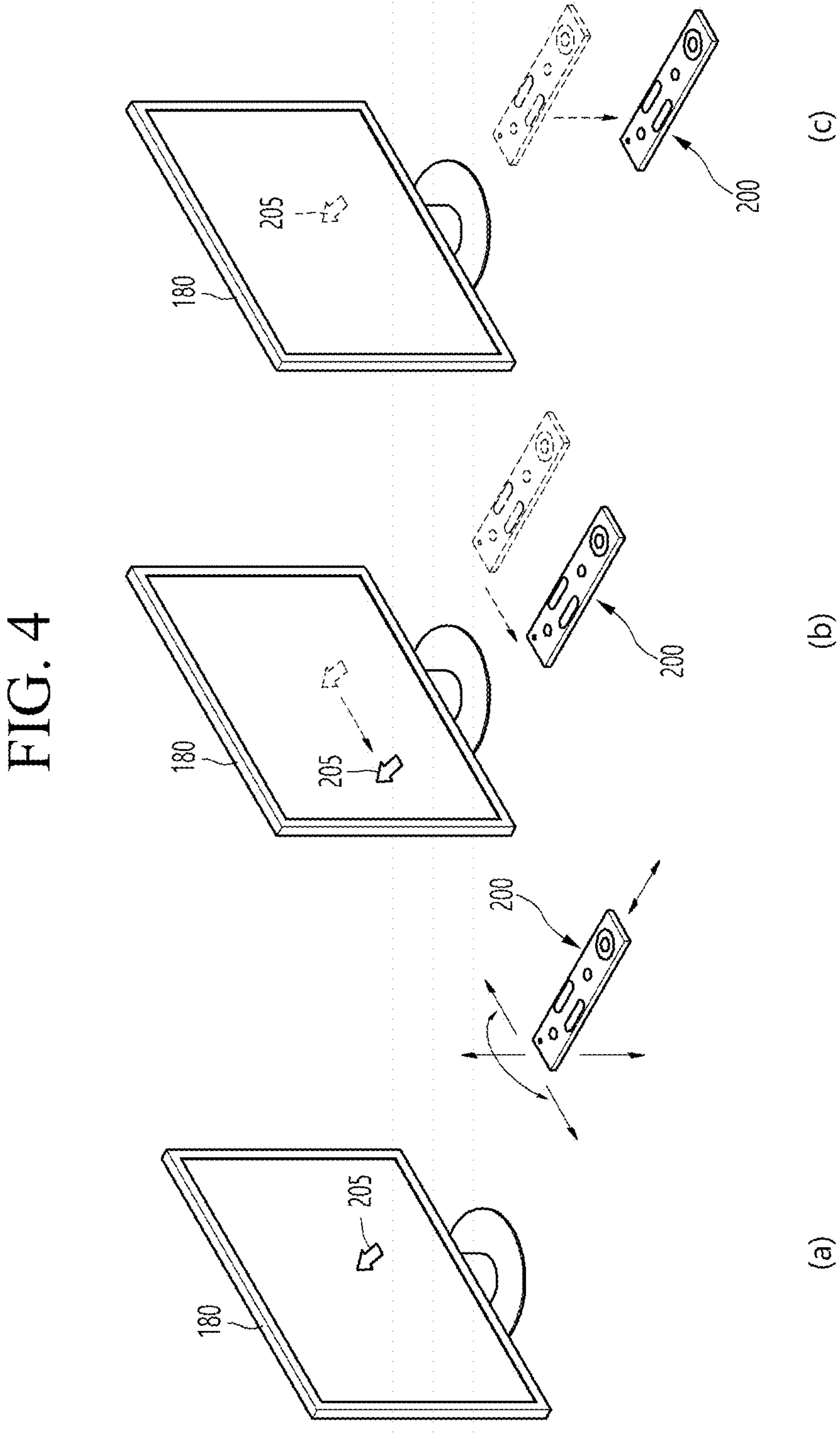
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
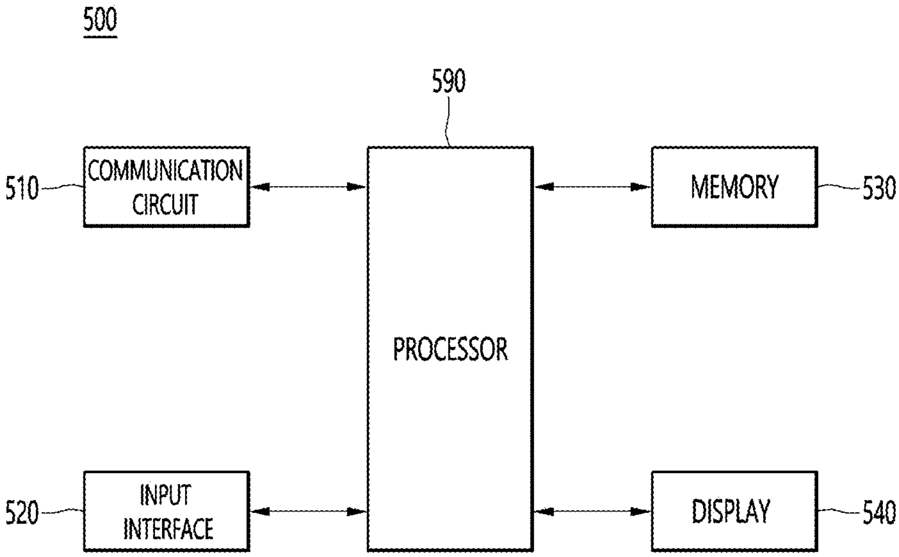
FIG. 5 is a block diagram for describing a configuration of a mobile terminal according to an embodiment of the present disclosure.

FIG. 5 is a block diagram for describing a configuration of a mobile terminal according to an embodiment of the present disclosure.

The mobile terminal 500 may be implemented by a stationary device or a mobile device, such as a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a desktop computer, and the like.

Referring to FIG. 5, the mobile terminal 500 may include a communication circuit 510, an input interface 520, a memory 530, a display 540, and a processor 590.

The communication circuit 510 may transmit/receive data to and from external devices such as other mobile terminals or servers using wired/wireless communication technologies.

The communication circuit 510 may perform communication using any one communication standard among GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

In this case, the input interface 520 may include a camera for inputting a video signal, a microphone for receiving an audio signal, and a user input interface for receiving information from a user.

The camera or the microphone may be treated as a sensor, and the signal acquired from the camera or the microphone may be referred to as sensing data or sensor information.

The memory 530 may store various software and data related to the operation of the mobile terminal 500.

The display 540 may display an image signal received from the outside.

The processor 590 may control the overall operation of the mobile terminal 500.

When the connection of an external device is required to perform the operation of the mobile terminal 500, the processor 590 may generate a control signal for controlling the external device and may transmit the generated control signal to the external device.

The processor 590 may acquire intention information for the user input and may determine the user's requirements based on the acquired intention information.

The processor 590 may control at least part of the components of the mobile terminal 500 so as to drive an application program stored in memory 170.

The processor 590 may operate two or more of the components included in the mobile terminal 500 in combination so as to drive the application program.

Figure 6A:
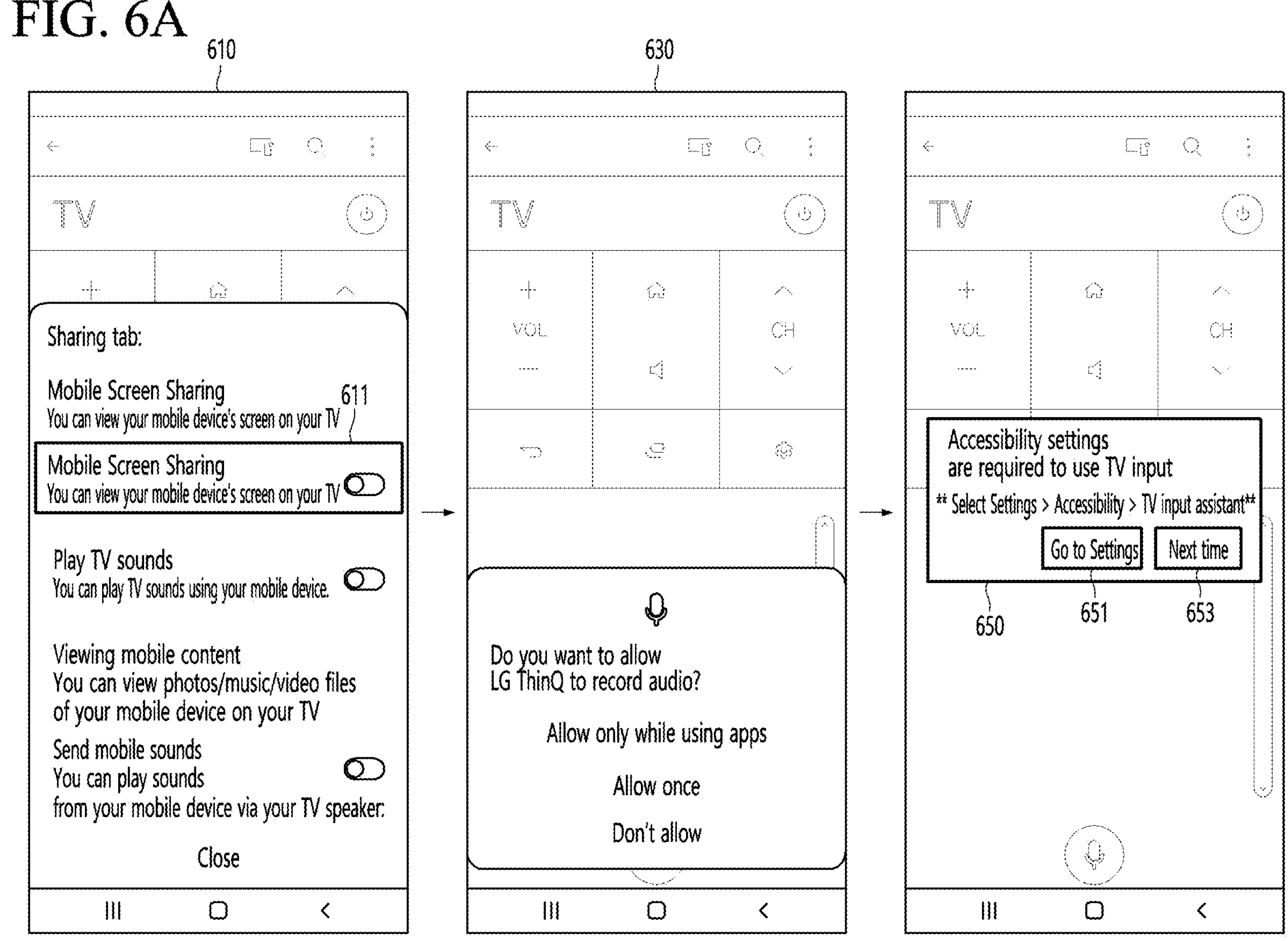
FIGS. 6A to 6D are diagrams for describing an operation scenario of using a user input back channel (UIBC) according to the related art.
Figure 6B:
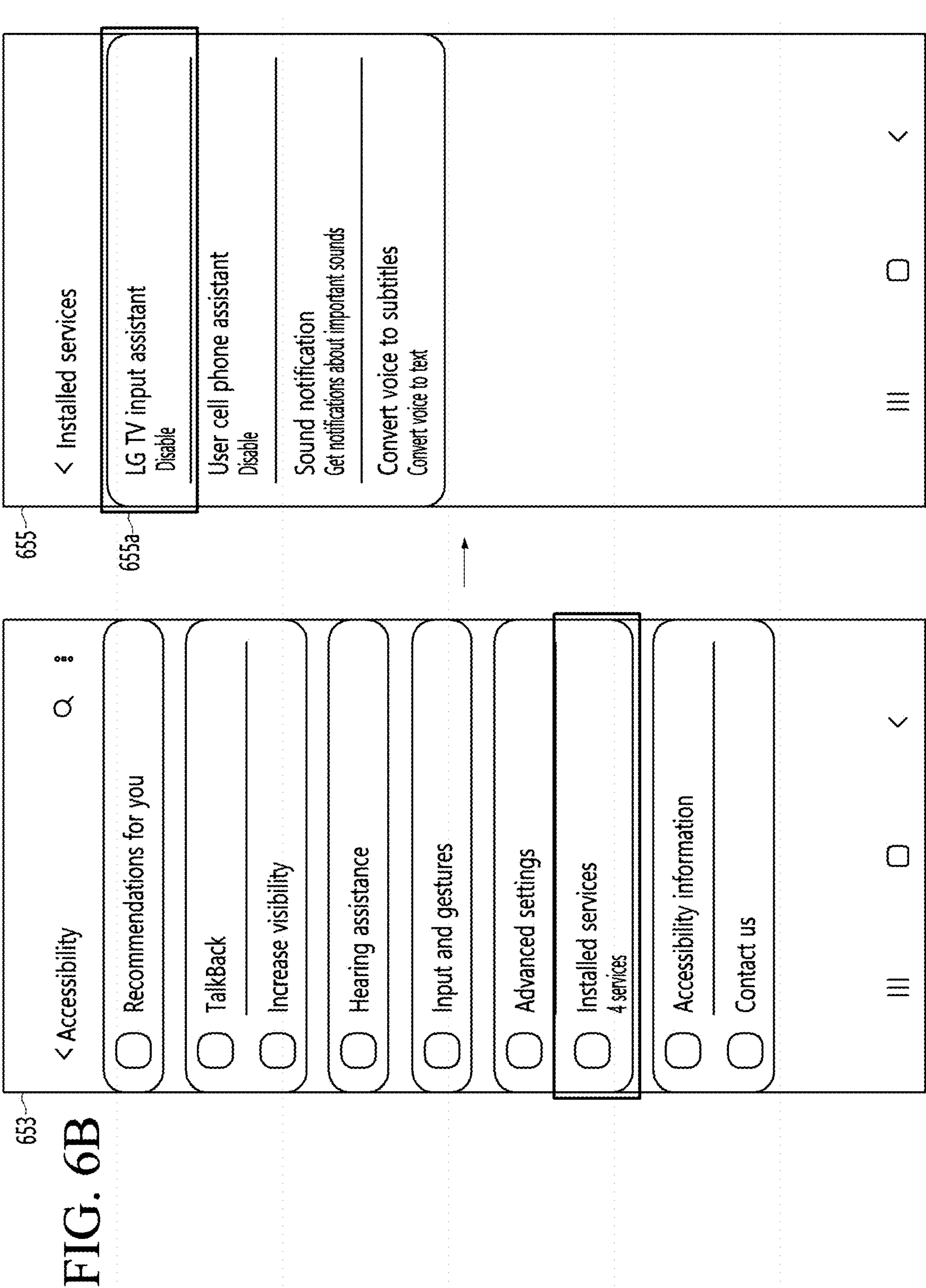

FIGS. 6A and 6B are diagrams for describing an operation scenario of using a user input back channel (UIBC) according to the related art.

The UIBC may be a channel for transmitting control information related to interaction through a user interface.

Specifically, UIBC may be a channel that controls the operation of the mobile terminal 500 by applying a user input to the display device 100 while the display device 100 and the mobile terminal 500 are performing a screen mirroring function.

FIGS. 6A to 6D are screens displayed by the mobile terminal 500 in the process of triggering an operation of using a UIBC on the mobile terminal 500.

Referring to FIG. 6A, a sharing tab screen 610 is a screen for sharing the screen of the mobile terminal 500. The sharing tab screen 610 may include a mobile screen sharing tab 611 for sharing a screen being displayed on the mobile terminal 500 with the display device 100.

When the mobile screen sharing tab 611 is selected, an app permission settings screen 630 is displayed, and an accessibility settings pop-up window 650 is displayed.

The accessibility settings pop-up window 650 is a window that always pops up to use the UIBC function.

The accessibility settings pop-up window 650 may include a settings button 651 for setting the UIBC function and a next button 653 for enabling the UIBC function to be set up later.

When the settings button 651 is selected, the mobile terminal 500 may display the accessibility settings screen 653, as shown in FIG. 6B.

Figure 6C:
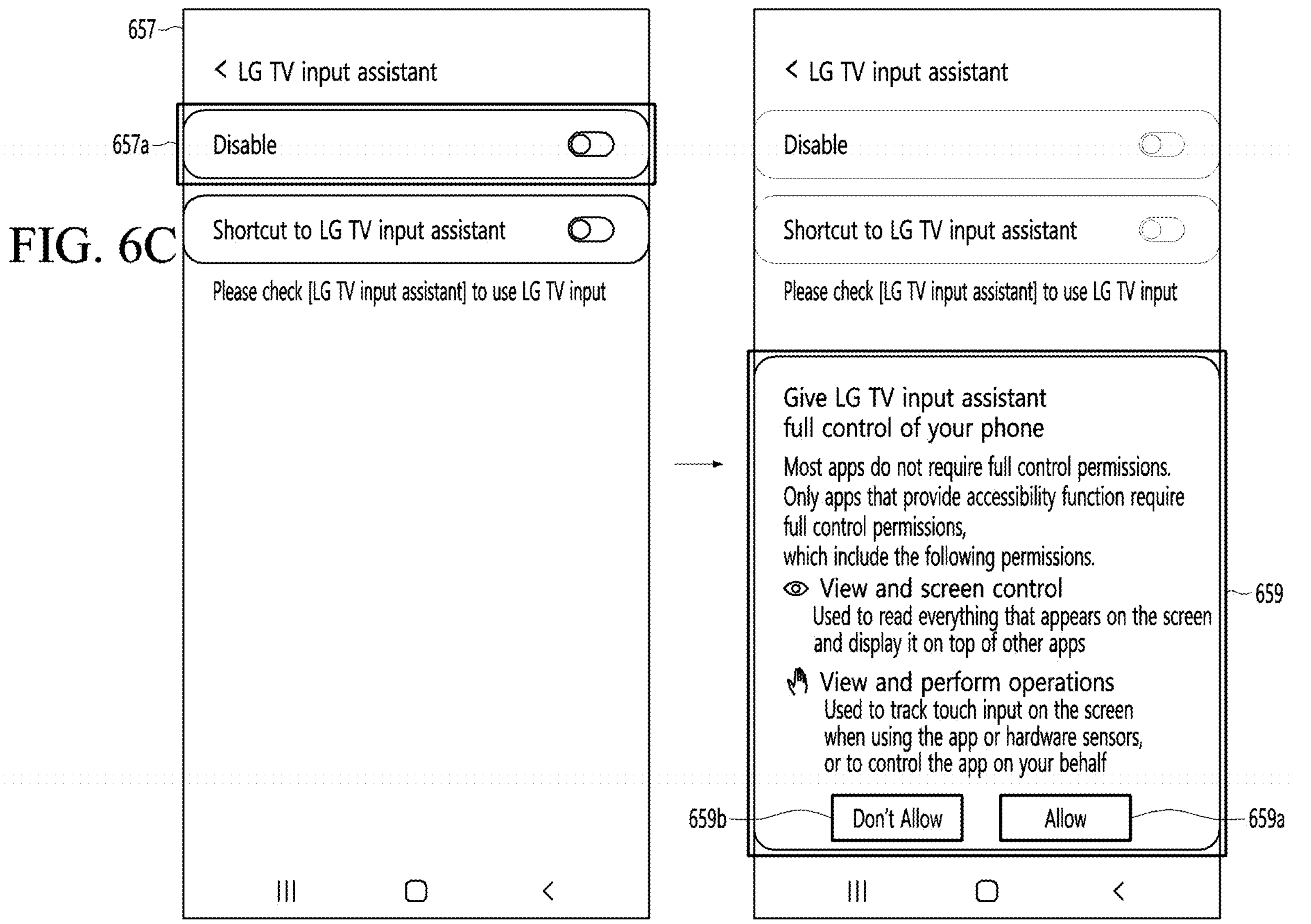

When an installed service tab *653a* displayed on the accessibility settings screen 653 is selected, an installed service screen 655 is displayed. When a TV input assistant tab *655a* is selected on the installed service screen 655, the TV input assistant screen 657 is displayed, as shown in FIG. 6C.

When an input that causes a usage settings tab *657a* included in the TV input assistant screen 657 to be activated is received, a control permission settings window 659 explaining permission of control of the mobile terminal 500 is displayed through TV input (a user input received by the display device 100).

The control permission settings window 659 may include a description *659a* of the control scope of the mobile terminal 500 through TV input, a disallow button *659c*, and an allow button *659b*.

The allow button *659b* is a button for allowing permission to control the operation of the mobile terminal 500 through TV input, and the disallow button *659c* is a button for disallowing the authority to control the operation of the mobile terminal 500 through TV input.

Figure 6D:
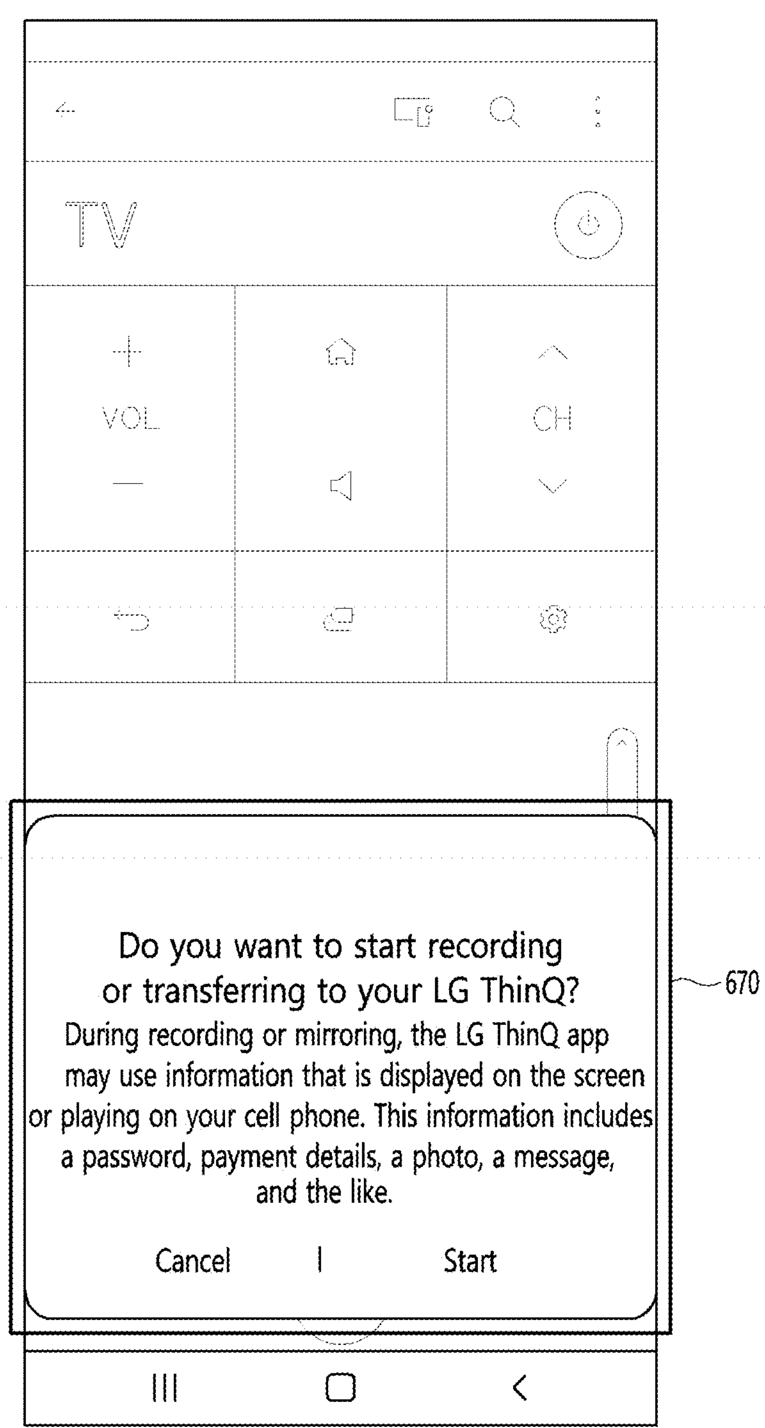

After settings are completed through the control permission settings window 659, the mobile terminal 500 may display a start pop-up window 670 notifying the start of screen mirroring, as shown in FIG. 6D.

Meanwhile, in FIG. 6A, even when the next button 653 included in the accessibility settings pop-up window 650 is selected, the start pop-up window 670 may be displayed.

When mirroring is executed, a user may use the UIBC function when selecting the allow button 659*b* included in the control permission settings window 659 according to FIGS. 6A to 6C.

When mirroring is executed, the accessibility settings pop-up 650 of FIG. 6A is always displayed at the start of casting (the start of mirroring) to inform the user that the UIBC function is available even when the UIBC function is not used.

In other words, for users who do not want to use the UIBC function, there was the inconvenience of needing to make unnecessary settings in the accessibility settings pop-up window 650 to execute the casting function (mirroring function) in order to execute the casting function.

Accordingly, the present disclosure presents a method of providing an accessibility settings pop-up window 650 according to the user's usability of the UIBC function.

Figure 7:
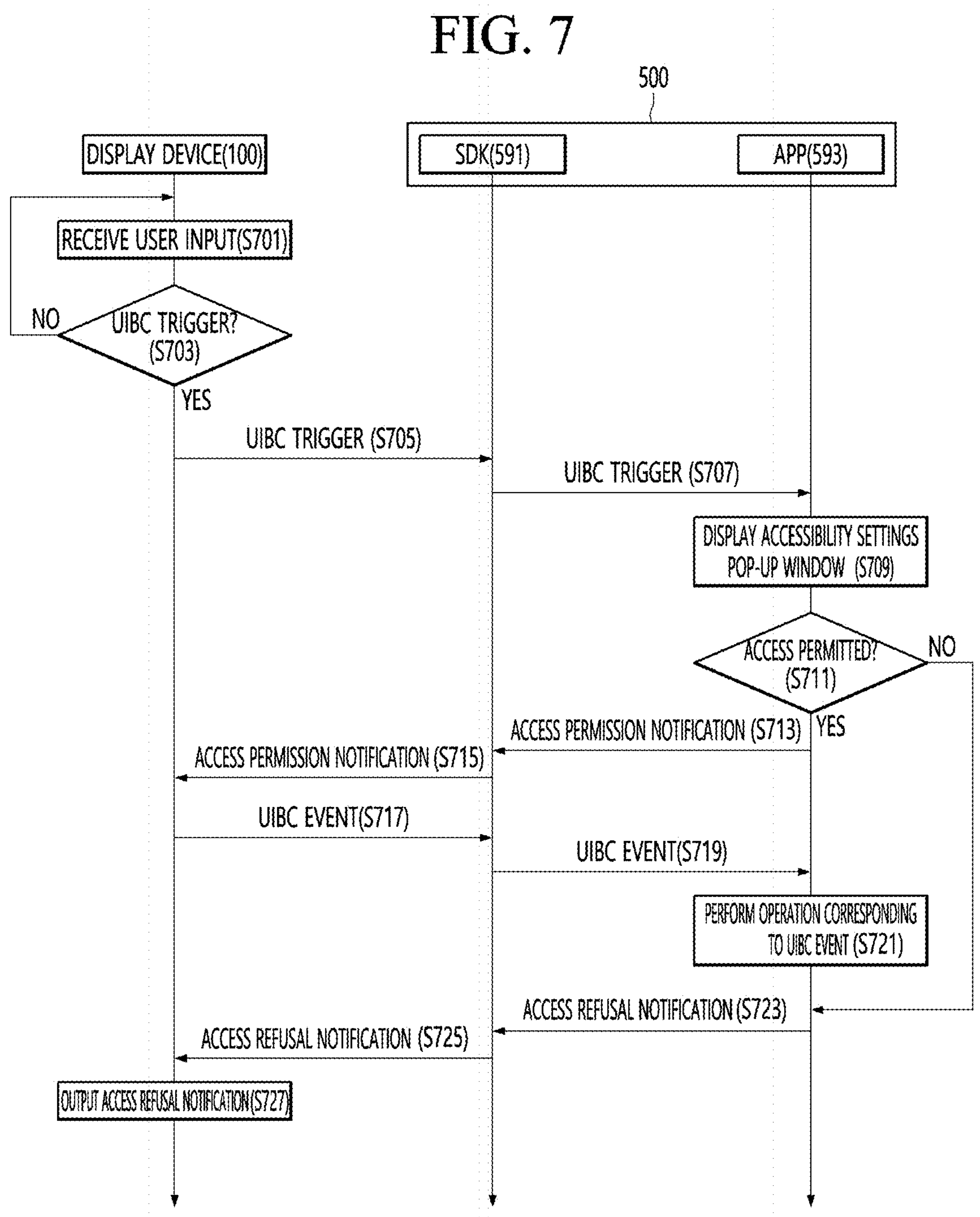
FIG. 7 is a ladder diagram for describing a method of operating a system according to an embodiment of the present disclosure.

FIG. 7 is a ladder diagram for describing a method of operating a system according to an embodiment of the present disclosure.

A system may include the display device 100 and the mobile terminal 500.

Also, in FIG. 7, it is assumed that the display device 100 is performing a screen mirroring function, which displays a screen being displayed by the mobile terminal 500.

Referring to FIG. 7, the controller 170 of the display device 100 may receive a user input (S701).

In one embodiment, the user input may be an operation signal received from the remote control device 200. The operation signal may be either a movement signal of the remote control device 200 or a selection signal such as a click signal.

In another embodiment, the user input may be an input for executing the UIBC function, which is transmitted onto the UI through the display 180.

In another embodiment, the user input may be a voice command uttered by the user.

The controller 170 of the display device 100 may determine whether the received user input is a UIBC trigger for executing the UIBC function (S703).

The UIBC trigger may be a trigger that causes the mobile terminal 500 to output the accessibility settings pop-up window 650.

When receiving an operation signal from the remote control device 200 through the user input interface 150 during execution of mirroring, the controller 170 may recognize the operation signal as a UIBC trigger.

While mirroring is being performed, the controller 170 may display a UI for executing the UIBC function on the display 180. When an OK input is received onto the UI for executing the UIBC function, the controller 170 may recognize the OK input as a UIBC trigger.

The user input (user input signal) may be a signal for activating the UIBC function through the UI.

While mirroring is being executed, the controller 170 may receive a voice command and, when the received voice command includes a specific keyword, recognize the voice command as a UIBC trigger.

A description related thereto will be given later with reference to FIGS. 8 to 10.

Figure 8:
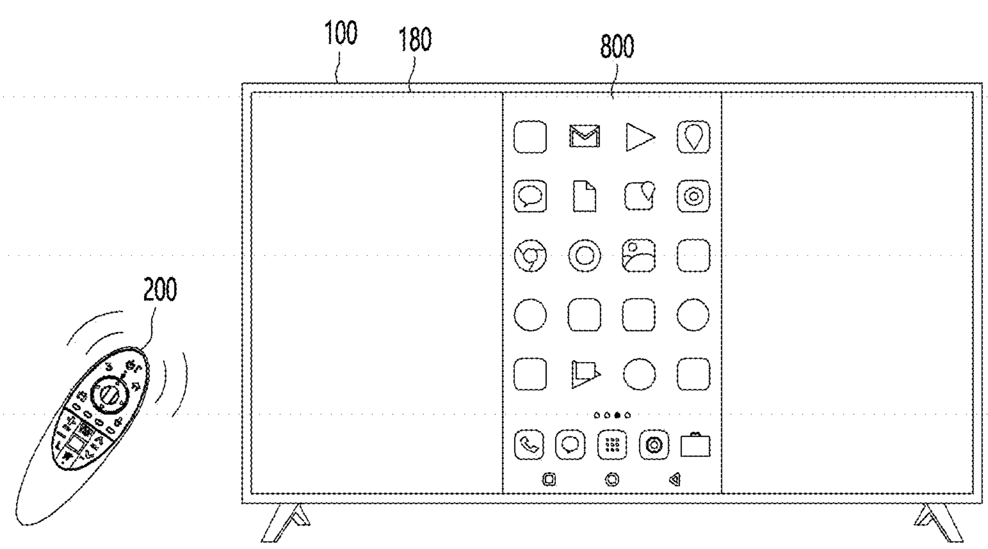
FIGS. 8 to 10 are diagrams for describing embodiments of recognizing a UIBC trigger according to an embodiment of the present disclosure.
Figure 8:
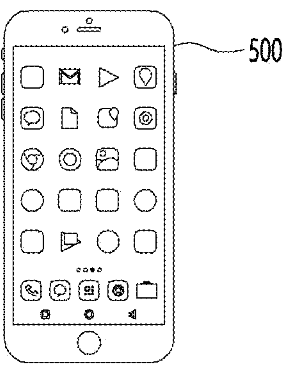
Figure 9:
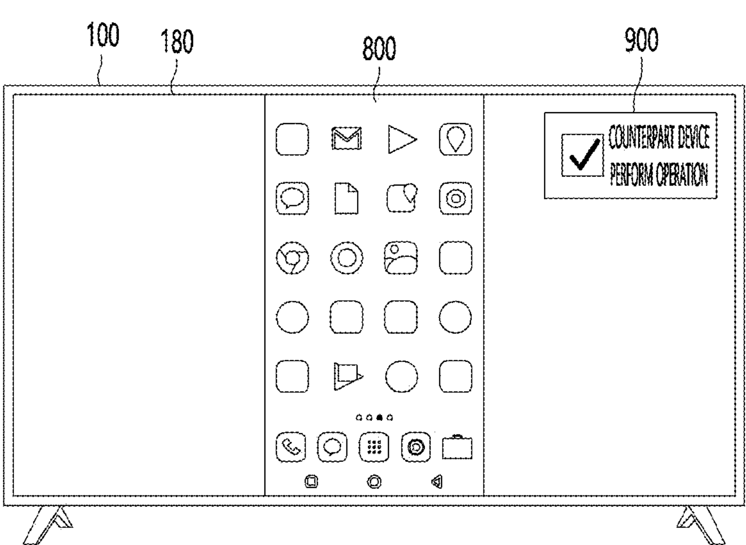
Figure 9:
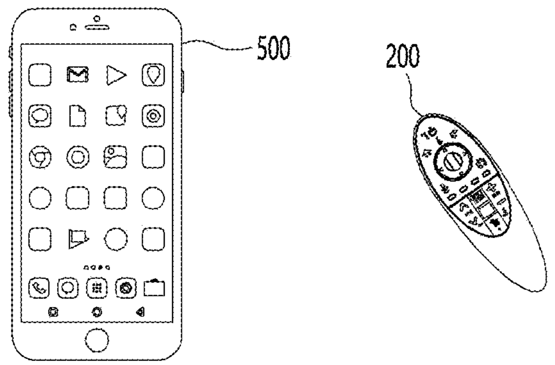
Figure 10:
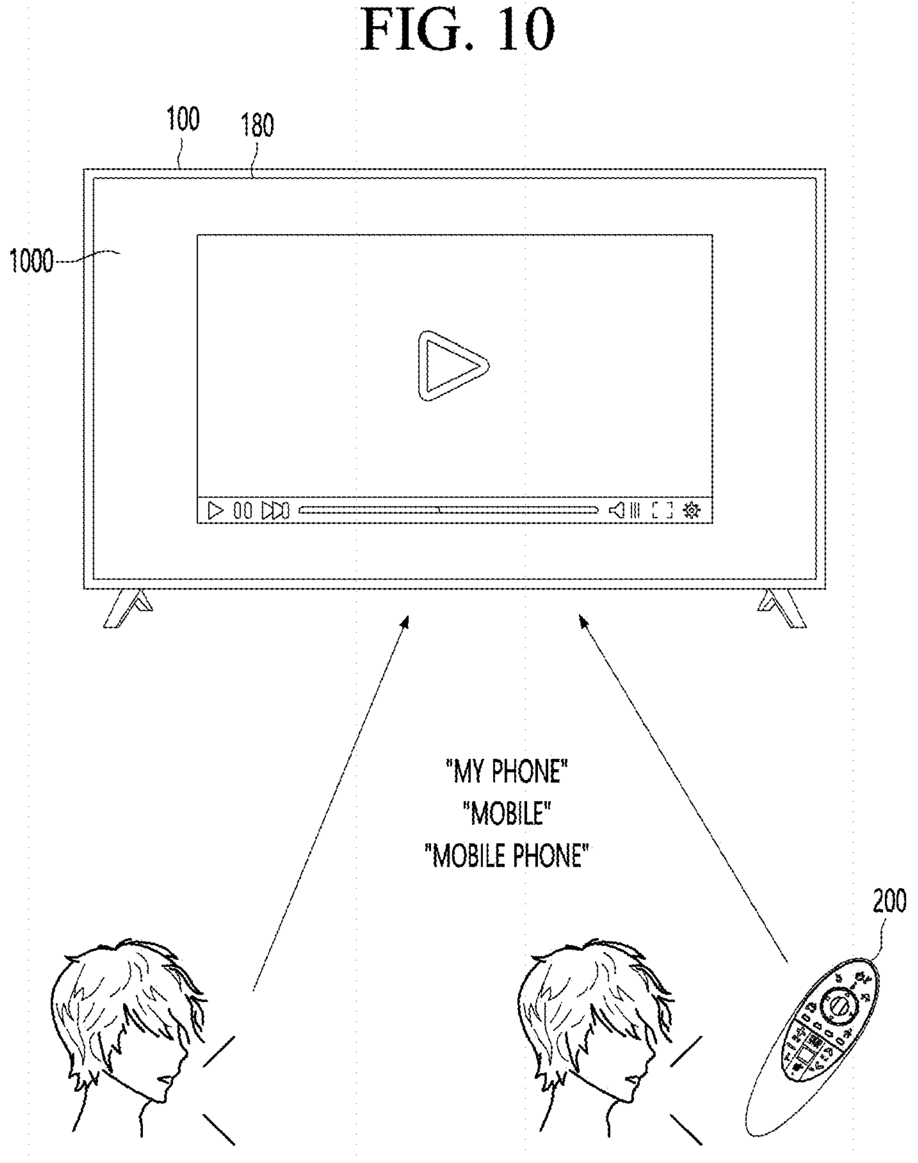

FIGS. 8 to 10 are diagrams for describing embodiments of recognizing a UIBC trigger according to an embodiment of the present disclosure.

In particular, FIG. 8 is an example of recognizing a UIBC trigger through movement or button selection of the remote control device 200, FIG. 9 is an example of recognizing a UIBC trigger through a UI displayed on the display device 100, and FIG. 10 is an example of recognizing a UIBC trigger through a keyword included in a voice command.

In FIGS. 8 to 10, it is assumed that the display device 100 displays mirroring images 800 and 1000 based on the image being displayed by the mobile terminal 500 on the display 180 through mirroring.

Referring to FIG. 8, the display device 100 may receive a movement signal or a selection signal from the remote control device 200.

The display device 100 may display a cursor that moves according to the movement of the remote control device 200, and recognize the movement of the remote control device 200 through the movement of the cursor.

The display device 100 may receive a selection signal (or click signal) corresponding to selection of a button provided on the remote control device 200 from the remote control device 200.

When receiving a movement signal or a selection signal from the remote control device 200 during mirroring with the mobile terminal 500, the display device 100 may determine that a UIBC trigger has been obtained.

The display device 100 may transmit the obtained UIBC trigger to the mobile terminal 500. The mobile terminal 500 may display an accessibility pop-up settings window 650 in response to the UIBC trigger received from the display device 100.

Next, a description will be given referring to FIG. 9.

Referring to FIG. 9, the display device 100 may display a mirroring image 800 and a UI 900 for executing the UIBC function on the display 180.

The display device 100 may display the UI 900 for executing the UIBC function on a letter box. The letter box may be a black image inserted by the mobile terminal 500 due to a difference between the resolution of the display device 100 and the resolution of the mobile terminal 500 when the mobile terminal 500 transmits an image.

The UI 900 for executing the UIBC function may include a check box. When the display device 100 receives a command to select the check box of the UI 900, the display device 100 may determine that a UIBC trigger has been obtained.

Next, a description will be given with reference to FIG. 10.

The display device 100 may receive a voice command uttered by a user while displaying a mirroring image 1000.

The display device 100 may receive a voice command through a microphone (not shown) provided therein, or may receive a voice command received by the remote control device 200.

The display device 100 may obtain text data from the received voice command and determine whether the obtained text data includes a preset keyword.

The display device 100 may convert a voice command into text data using a STT (Speech To Text) engine. As another example, the display device 100 may transmit a voice command to an STT server and receive text data corresponding to the voice command from the STT server.

When the text data includes a keyword such as the name of the mobile terminal 500, the display device 100 may determine that a UIBC trigger has been obtained.

For example, keywords may be <my phone>, <mobile>, <mobile phone>, or the like, but are only examples.

The display device 100 may determine the user's intention to control the mobile terminal 500 through analysis of the voice command and transmit a UIBC trigger to the mobile terminal 500.

When the controller 170 of the display device 100 determines that the user input is a UIBC trigger for requesting a UIBC function, the controller 170 of the display device 100 may transmit the UIBC trigger to a Software Development Kit (SDK) 591 of the mobile terminal 500 (S705).

The SDK 591 of the mobile terminal 500 may transmit the received UIBC trigger to an APP 593 (S707).

The processor 590 of the mobile terminal 500 may include the SDK 591 and the APP 593.

The SDK 591 may be a set of tools that provide functions of allowing a user to create a custom app capable of being added to or linked to other programs.

The APP 593 may be an application for managing home appliances, which is installed on the mobile terminal 500.

The APP 593 of the mobile terminal 500 may display an accessibility settings pop-up window on the display 540 in response to the UIBC trigger (S709).

The APP 593 of the mobile terminal 500 may display the accessibility settings pop-up window 650 according to the UIBC trigger.

That is, the mobile terminal 500 may automatically display the accessibility settings pop-up window upon receipt of a UIBC trigger, without a separate entry screen for settings of the UIBC function.

The display device 100 may determine the user's intention to use the UIBC function and control the mobile terminal 500 to display the accessibility settings pop-up window 650.

Figures 11, 12:
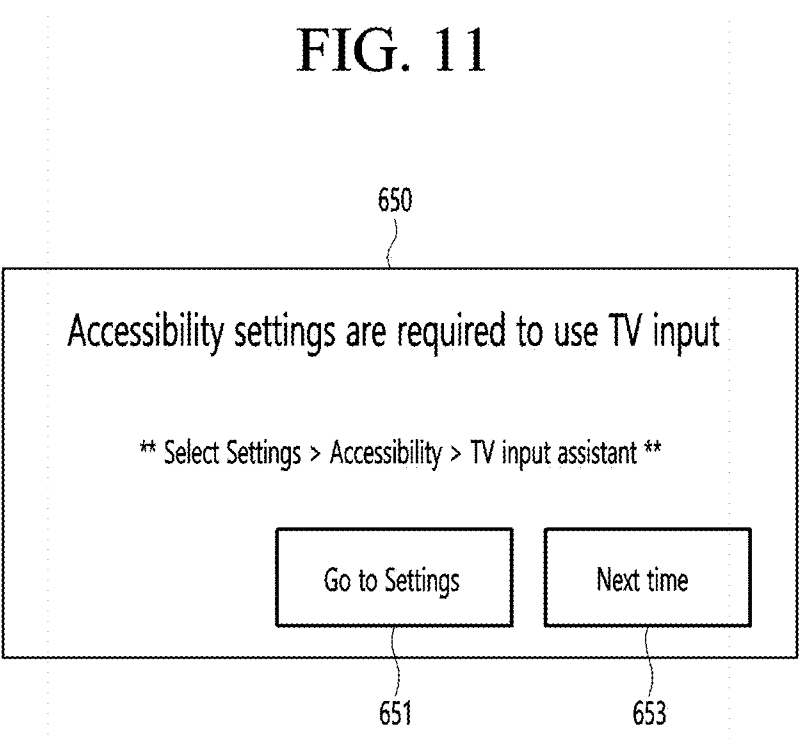
FIG. 11 is an example of an accessibility settings pop-up window according to an embodiment of the present disclosure.
FIG. 12 is a diagram for describing information included in a UIBC event according to an embodiment of the present disclosure.

FIG. 11 is an example of an accessibility settings pop-up window according to an embodiment of the present disclosure.

The accessibility settings pop-up window 650 may include a settings button 651 for setting the UIBC function and a next button 653 for enabling the UIBC function to be set up later.

Operations subsequent to selection of the settings button 651 and the next button 653 will be describe with reference to FIGS. 6A to 6C.

Again, description will be given with reference to FIG. 7.

The APP 593 of the mobile terminal 500 may determine whether permission of access to the UIBC function is set through a touch input on the accessibility settings pop-up window (S711).

When the APP 593 of the mobile terminal 500 is set to allow access to the UIBC function is set, the APP 593 of the mobile terminal 500 may transmit an access permission notification to the SDK 591 (S713), and the SDK 591 may transmit the access permission notification to the display device 100 through the communication circuit 510 (S715).

When receiving the access permission notification, the controller 170 of the display device 100 may display the access permission notification through the display 180 or output the access permission notification through the speaker 185.

Thereafter, the controller 170 of the display device 100 may transmit a UIBC event to the SDK 591 of the mobile terminal 500 (S717), and the SDK 591 may transfer the UIBC event to the APP 593 (S719).

The UIBC event may be an event that controls the operation of the mobile terminal 500 through UIBC.

The UIBC event may be an event such as selection of a specific app icon in the mirroring image 800 or an app control command when an app is running.

FIG. 12 is a diagram for describing information included in a UIBC event according to an embodiment of the present disclosure.

A UIBC event may be transmitted to the mobile terminal 500 in the form of a packet.

The UIBC event may include a UIBC identifier, UIBC type, and coordinate information.

The UIBC identifier may be an ID value for identifying the UIBC event.

The UIBC type may refer to the type of a user input and may indicate mouse up/down or whether a button is selected.

The coordinate information may include the coordinate value of a point where the UIBC event is received within the mirroring image 800.

Again, description will be given with reference to FIG. 7.

The APP 593 of the mobile terminal 500 may perform an operation corresponding to the UIBC event (S721).

The mobile terminal 500 may perform the corresponding operation using information included in the UIBC event.

As described above, according to an embodiment of the present disclosure, it is possible to determine the user's intention to control the mobile terminal 500 during mirroring automatically, and provide the accessibility settings pop-up window 650.

Accordingly, the user may set the execution of the UIBC function through the accessibility settings pop-up window 650 without a complicated process.

Meanwhile, when the APP 593 of the mobile terminal 500 is set to refuse access to the UIBC function, the APP 593 of the mobile terminal 500 may transmit an access refusal notification to the SDK 591 (S723), and the SDK 591 may transmit the access refusal notification to the display device 100 through the communication circuit 510 (S725).

The access to the UIBC function may be refused depending on settings input through the accessibility settings pop-up window 650.

When receiving the access refusal notification, the controller 70 of the display device 100 may output an access refusal notification indicating that access to the mobile terminal 500 is impossible (S727).

The access refusal notification may be a notification indicating that access control of the mobile terminal 500 is impossible through the UIBC function.

Figure 13:
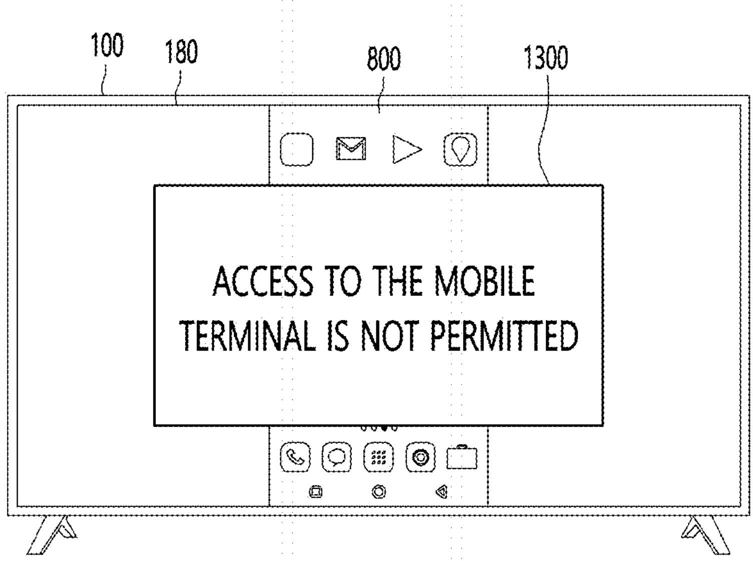
FIG. 13 is a diagram for describing an example of an access refusal notification according to an embodiment of the present disclosure.

FIG. 13 is a diagram for describing an example of an access refusal notification according to an embodiment of the present disclosure.

Referring to FIG. 13, the display device 100 may display an access refusal notification window 1300 overlapping the mirroring image 800 according to an access refusal notification received from the mobile terminal 500.

As another example, the access refusal notification window 1300 may be displayed on a letter box adjacent to the mirroring image 800.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A display device comprising:

a wireless communication interface configured to perform wireless communication with a mobile terminal;

a display configured to display a mirroring image based on an image being displayed by the mobile terminal; and a controller configured to receive a user input signal while displaying the mirroring image, determine whether the received user input signal is a user input back channel (UIBC) trigger for execution of a UIBC function, and transmit the UIBC trigger to the mobile terminal through the wireless communication interface when the received user input signal is determined as the UIBC trigger for execution of the UIBC function, wherein the UIBC trigger is configured to cause the mobile terminal to output an accessibility settings pop-up window, wherein the accessibility settings pop-up window includes at least one menu for setting the UIBC function, and wherein the controller is further configured to:

recognize the received user input signal as the UIBC trigger by determining whether the received user input signal corresponds to at least one preset user input having an intention to use the UIBC function; and cause the mobile terminal, via a software development kit (SDK) executed on the mobile terminal and an application (APP) executed on the mobile terminal, to automatically display the accessibility settings pop-up window in response to the UIBC trigger without a separate entry screen for UIBC settings.

2. The display device of claim 1, wherein the controller is further configured to recognize the user input signal as the UIBC trigger when the user input signal is either a movement signal of a remote control device which is received from the remote control device or a selection signal for a button provided on the remote control device.

3. The display device of claim 1, wherein the controller is further configured to:

display a User Interface (UI) for execution of the UIBC function on a display unit; and recognize the user input signal as the UIBC trigger when the user input signal is a signal for enabling activation of the UIBC function through the UI.

4. The display device of claim 1, further comprising:

a microphone configured to receive a voice command uttered by a user, wherein the controller is further configured to recognize the user input signal as the UIBC trigger when a preset keyword is included in the voice command.

5. The display device of claim 1, wherein the controller is further configured to:

receive, from the mobile terminal, a notification that the UIBC function is allowed to be accessed; and receive a UIBC event for controlling the mobile terminal from a remote control device, and transmit the received UIBC event to the mobile terminal.

6. The display device of claim 5, wherein the UIBC event includes a UIBC type and coordinate values of a point at which the UIBC event is received.

7. The display device of claim 1, wherein the controller is further configured to display a notification that the UIBC function is not allowed to be accessed on the display when the notification that the UIBC function is not allowed to be accessed is received from the mobile terminal.

8. A method for operating a display device, the method comprising:

displaying a mirroring image based on an image being displayed by a mobile terminal;

receiving a user input signal while displaying the mirroring image;

determining whether the received user input signal is a user input back channel (UIBC) trigger for execution of a UIBC function;

transmitting the UIBC trigger to the mobile terminal when the received user input signal is determined as the UIBC trigger for execution of the UIBC function, wherein the UIBC trigger is configured to cause the mobile terminal to output an accessibility settings pop-up window, and wherein the accessibility settings pop-up window includes at least one menu for setting the UIBC function;

recognizing the received user input signal as the UIBC trigger by determining whether the received user input signal corresponds to at least one preset user input having an intention to use the UIBC function; and causing the mobile terminal, via a software development kit (SDK) executed on the mobile terminal and an application (APP) executed on the mobile terminal, to automatically display the accessibility settings pop-up window in response to the UIBC trigger without a separate entry screen for UIBC settings.

9. The method of claim 8, wherein the recognizing includes recognizing the user input signal as the UIBC trigger when the user input signal is either a movement signal of a remote control device which is received from the remote control device or a selection signal for a button provided on the remote control device.

10. The method of claim 8, further comprising:

displaying a User Interface (UI) for execution of the UIBC function; and wherein the recognizing includes recognizing the user input signal as the UIBC trigger when the user input signal is a signal for enabling activation of the UIBC function through the UI.

11. The method of claim 8, further comprising:

receiving a voice command uttered by a user, wherein the recognizing includes recognizing the user input signal as the UIBC trigger when a preset keyword is included in the voice command.

12. The method claim 8, further comprising:

receiving, from the mobile terminal, a notification that the UIBC function is allowed to be accessed;

receiving a UIBC event for controlling the mobile terminal from a remote control device; and transmitting the received UIBC event to the mobile terminal.

13. The method of claim 12, wherein the UIBC event includes a UIBC type and coordinate values of a point at which the UIBC event is received.

* * * * *